(12) United States Patent
Nose

(10) Patent No.: US 7,508,413 B2
(45) Date of Patent: Mar. 24, 2009

(54) VIDEO CONFERENCE DATA TRANSMISSION DEVICE AND DATA TRANSMISSION METHOD ADAPTED FOR SMALL DISPLAY OF MOBILE TERMINALS

(75) Inventor: Masaki Nose, Saitama-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 715 days.

(21) Appl. No.: 11/112,046

(22) Filed: Apr. 22, 2005

(65) Prior Publication Data
US 2005/0243810 A1    Nov. 3, 2005

(30) Foreign Application Priority Data
Apr. 30, 2004    (JP)    ............. 2004-136587

(51) Int. Cl.
*H04N 7/14*    (2006.01)
*H04L 10/16*    (2006.01)

(52) U.S. Cl. ............... 348/14.09; 348/14.08; 348/14.01

(58) Field of Classification Search ... 348/14.01–14.09, 348/14.1, 14.11–14.16; 370/260–261; 709/204, 709/207, 246, 239, 329
See application file for complete search history.

(56) References Cited
U.S. PATENT DOCUMENTS 5,963,246 A * 10/1999 Kato ................ 348/14.09

6,317,776 B1 * 11/2001 Broussard et al. .......... 709/204
2003/0142635 A1 * 7/2003 Roher et al. ............... 370/260

FOREIGN PATENT DOCUMENTS

| JP | 10-126757 A |   | 5/1998 |
|----|-------------|---|--------|
| JP | 11-65950    |   | 3/1999 |
| JP | 11112955 A  | * | 4/1999 |
| JP | 2002-325239 |   | 11/2002 |
| JP | 2004-136587 |   | 5/2004 |

* cited by examiner

*Primary Examiner*—Melur Ramakrishnaiah
(74) *Attorney, Agent, or Firm*—Foley & Lardner LLP

(57) ABSTRACT

Images and voice data of conference call participants are transmitted to user terminals to permit video conference calling. Mobile terminals receive moving images of only the current speaker to permit easy recognition of the visual image on the relatively small display terminal of the mobile user. A multipoint controller distributes two types of distribution streaming data, first and second distribution streaming data. The first distribution streaming data are constituted of moving images transmitted from all of user terminals. The second distribution streaming data contain only the moving image from the user terminal of the current speaker, among the user terminals. The first distribution streaming data are used as distribution information for user terminals such as a personal computer or a video conference-dedicated terminal, while the second distribution streaming data are used as distribution information for mobile user terminals such as a mobile telephone and a PDA.

16 Claims, 8 Drawing Sheets

| User Name | Password | Speker Flag | IP Adress | Terminal Type | Other |
|---|---|---|---|---|---|
| AAA_AAA | xxxxx | | IP_A | PC | |
| BBB_BBB | xxxxx | | IP_B | PC | |
| CCC_CCC | xxxxx | | IP_C | PC | |
| DDD_DDD | xxxxx | | IP_D | PDA | |
| EEE_EEE | xxxxx | | IP_E | Mobile Phone | |
| | | | | | |

Fig. 8

| User Name | PassWord | Speaker Flag | IP Address | Terminal Type | Display Mode |
|---|---|---|---|---|---|
| AAA_AAA | xxxxx | | IP_A | PC | Mode1 |
| BBB_BBB | xxxxx | | IP_B | PC | Mode2 |
| CCC_CCC | xxxxx | | IP_C | PC | Mode1 |
| DDD_DDD | xxxxx | | IP_D | PDA | |
| EEE_EEE | xxxxx | | IP_E | Mobile Phone | |
| | | | | | |

VIDEO CONFERENCE DATA TRANSMISSION DEVICE AND DATA TRANSMISSION METHOD ADAPTED FOR SMALL DISPLAY OF MOBILE TERMINALS

CROSS-REFERENCE TO RELATED APPLICATIONS

This application is based upon and claims the benefit of priority from prior Japanese Patent Application No. 2004-136587, filed Apr. 30, 2004, the entire contents of which are incorporated herein by reference.

BACKGROUND OF THE INVENTION

1. Field

The present invention relates to a data transmission device and a data transmission method to be used for carrying out data transmission to and from each of a plurality of user terminals in order to perform video conferencing.

2. Description of the Related Art

Recently, because of progress in network and information technologies, deployment of video conferencing systems (also referred to as TV conferencing systems) are coming into practical use. A video conferencing system is used for connecting a plurality of user terminals to one another so that image information and voice information are sent and received among the plurality of user terminals.

A known exemplary video conferencing system operates to receive and redistribute images from and to all participants of the conference (see, for example, JP-A-10-126757).

In the system described in JP-A-10-126757, a picture including images (moving or static) of N conference participants is displayed on a display of each of the terminals. Further, in order to reduce a quantity of data to be transferred, only a speaker is displayed by way of a dynamic or moving image while the rest of the conference participants are displayed by way of static images.

Recently, along with the prevalence of mobile terminals such as mobile phones and PDAs (Personal Digital Assistants), there is an increasing demand for a system which enables participation in the video conference from remote locations.

However, the size of the display (and most importantly, the display resolution) of the mobile terminals such as the mobile phone and the PDA is very small as compared with the size and resolution of personal computers and video conference-dedicated terminals. Therefore, when the images of all the conference participants are displayed on the display of the mobile terminal, the visibility of each of the images of the conference participants is considerably deteriorated.

SUMMARY

The present invention has been accomplished in view of the above-described circumstances, and an object thereof is to provide a data transmission device and a data transmission method which enable to display images having a sufficiently high visibility on a user terminal such as a mobile terminal for a conference.

In accordance with an embodiment of the invention, there is provided a data transmission device for executing a data transmission to and from each of a first user terminal, a second user terminal, and a third user terminal. The data transmission device includes a receiving unit for receiving voice data and moving image data transmitted from each of the first user terminal and the second user terminal; an identifying unit for identifying a user terminal of a current speaker from among the first user terminal and the second user terminal, based on the voice data which have been transmitted from the first user terminal and the second user terminal and received by the receiving unit; a selecting unit for selecting from among the moving image data sent from the first user terminal and the second user terminal the moving image data corresponding to the user terminal identified by the identifying unit; and a transmitting unit for transmitting selected image information having the moving image data selected by the selecting unit to the third user terminal, and not the image information having the moving image data which is not selected by the selecting unit.

According to another embodiment of the invention, there is provided a data transmission device for executing a data transmission to and from each of a plurality of user terminals including a mobile terminal. The device includes a receiving unit for receiving voice data and moving image data transmitted from the plurality of user terminals; an identifying unit for identifying a user terminal of a current speaker from among the plurality of user terminals, based on the voice data which have been transmitted from the plurality of user terminals and received by the receiving unit; a multiplexing unit for multiplexing the voice data which have been transmitted from the plurality of user terminals and received by the receiving unit; a selecting unit for selecting the moving image data of the user terminal identified by the identifying unit from among the moving image data which have been transmitted from the plurality of user terminals and received by the receiving unit; a first generating unit for generating first distribution information comprising the moving image data of the plurality of user terminals received by the receiving unit and the voice data multiplexed by the multiplexing unit; a second generating unit for generating second distribution information comprising the moving image data selected by the selecting unit and the voice data multiplexed by the multiplexing unit; a first transmitting unit for transmitting the first distribution information generated by the first generating unit to the plurality of user terminals other than the mobile terminal; and a second transmitting unit for transmitting the second distribution information generated by the second generating unit to the mobile terminal.

According to yet another aspect of the invention, there is provided a data transmission method for executing a data transmission to and from each of a first user terminal, a second user terminal, and a third user terminal. The method includes a receiving step for receiving voice data and moving image data transmitted from each of the first user terminal and the second user terminal; an identifying step for identifying a user terminal of a current speaker from among the first user terminal and the second user terminal based on the voice data from the first user terminal and the second user terminal received in the receiving step; a selecting step for selecting, from the moving image data which have been transmitted from the first user terminal and the second user terminal and received in the receiving step, the moving image data of the user terminal identified in the identifying step; and a transmitting step for transmitting selected image information comprising the moving image data selected in the selecting step to the third user terminal, and not the image information having the moving image data which is not selected in the selecting step.

BRIEF DESCRIPTION OF THE DRAWINGS

FIG. 8 is a view showing another example of the user information database managed by the data transmission device according to the embodiment.

DETAILED DESCRIPTION OF THE INVENTION

Hereinafter, embodiments of the present invention will be described with reference to the drawings.

Figure 1:
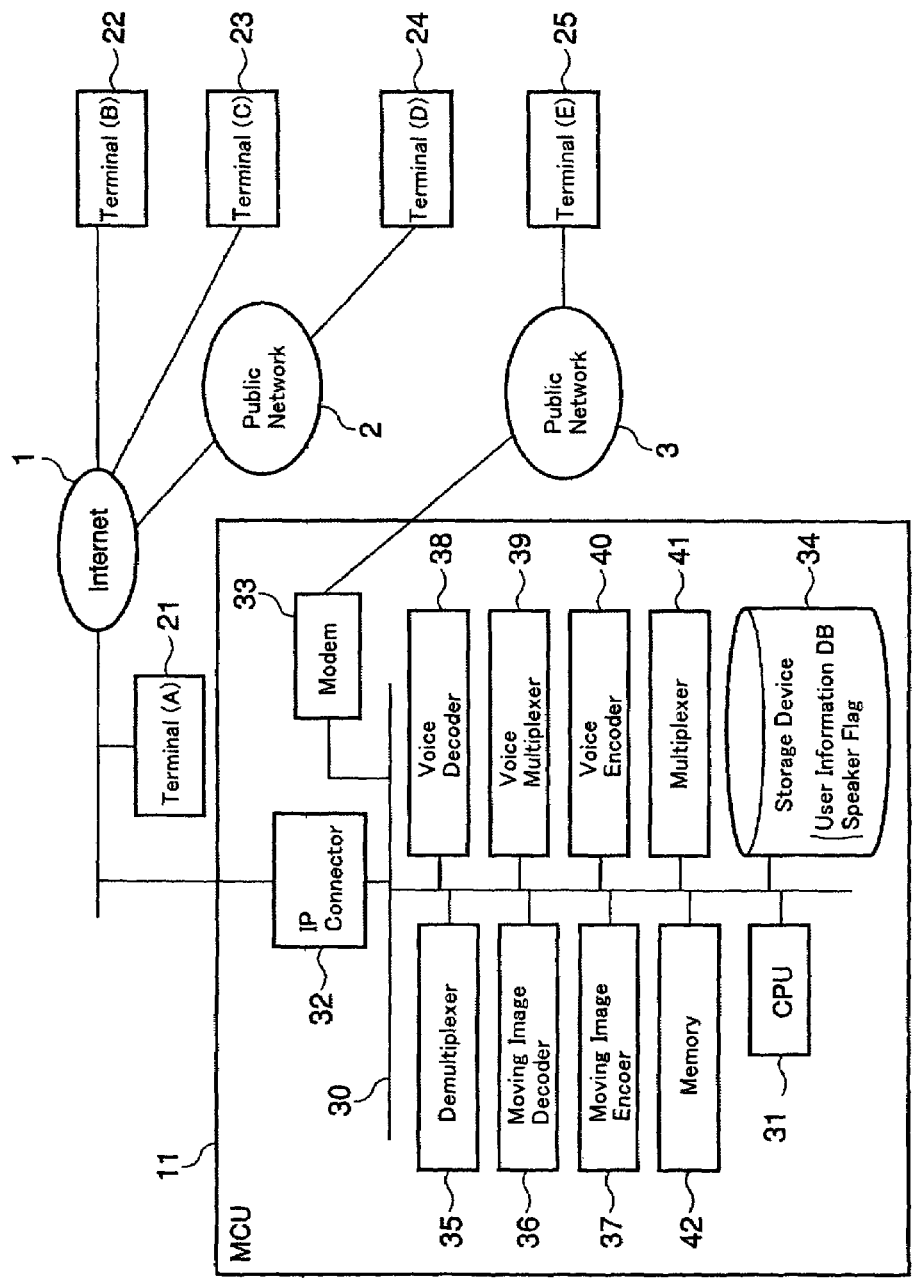
FIG. 1 is a diagram showing a constitution of a video conference system including a data transmission device according to one embodiment of the present invention.

Shown in FIG. 1 is an example of the construction of a video conferencing system according to an embodiment of the invention. The video conferencing system is used for video conferencing among a plurality of user terminals utilizing a multipoint control unit (MCU) 11. The multipoint control unit 11 is connected to each of the user terminals via a network. In FIG. 1, a user terminal (A) 21 is connected to the multipoint control unit 11 via a LAN, while a user terminal (B) 22 and a user terminal (C) 23 are connected to the multipoint control unit 11 via the internet 1. A user terminal (D) 24 is connected to the multipoint control unit 11 via a public network 2 and the Internet 1, while a user terminal (E) 25 is connected to the multipoint control unit 11 via a public network 3. Each of the user terminal (A) 21, the user terminal (B) 22, and the user terminal (C) 23 may be implemented by a personal computer or a video conference-dedicated terminal. The user terminal (D) 24 may take the form of a mobile terminal such as a PDA, and the user terminal (E) 25 may be a mobile terminal such as a mobile phone, for example.

Each of the user terminals 21 to 25 has a camera for taking a picture of the user and a microphone for inputting the voice of the user. Each of the user terminals 21 to 25 generates moving or dynamic image data (video data) and voice data (audio data) by compressing and encoding the moving image data input from the camera and the voice data input from the microphone. Then, each of the user terminals 21 to 25 sends streaming data generated by multiplexing the video data with the voice data to the multipoint control unit 11.

It is assumed that users A-E use the user terminals 21-25 respectively. In this case, the streaming data including the moving images and the voices of the users A to E are sent from the user terminals 21 to 25 to the multipoint control unit 11.

The multipoint control unit 11 is a data transmission device for sending and receiving image information and voice information for the video conference among the user terminals 21 to 25. The multipoint control unit 11 generates the image information and the voice information for the video conference using the moving images and the voice data received from the user terminals 21 to 25. The multipoint control unit 11 distributes the image information and the voice information generated for the video conference to each of the user terminals 21 to 25.

In this embodiment, two kinds of streaming data, i.e. first and second streaming data, are used as the distribution information which is the information to be distributed to the user terminals 21 to 25. The first distribution streaming data are composed of moving images of all the conference participants (users A to E) and voices of all the conference participants (users A to E). The second distribution streaming data are composed of only the moving images corresponding to the current speaker together with the voices of all of the users A to E. The first distribution streaming data is used as the distribution information for a user terminal which is a personal computer or the video conference-dedicated terminal, while the second distribution streaming data are used as the distribution information for a user terminal which is a mobile terminal. Accordingly, in reference to FIG. 1, only the moving images of the current speaker are distributed to the user terminals 24 and 25 as the image information for the video conference. Thus, only the moving image of the current speaker, not the images of all the conference participants, is displayed on each of the display screens of the user terminals 24 and 25.

As shown in FIG. 1, the multipoint control unit 11 includes a CPU 31, an IP (Internet Protocol) connector 32, a modem 32, a storage device 34, a demultiplexer 35, a moving image decoder 36, a moving image encoder 37, a voice decoder 38, a voice multiplexer 39, a voice encoder 40, a multiplexer 41, and a memory 42. These components are connected to one another via a bus 30.

The CPU 31 is a processor for controlling the operation of the multipoint controller 11, which executes a program stored in the memory 42. The CPU 31 executes a function of identifying the user terminal corresponding to the current speaker among the user terminals 21 to 25 based on the voice data received from the user terminals 21 to 25. In this case, the CPU 31 measures gains of the voice data of the user terminals 21 to 25 to identify the main current speaker (one person) based on the measurement result.

The IP connector 32 is a communication device for executing communication by the use of the IP, which is connected to the Internet via the LAN. The modem 33 is connected to the public network 3. The streaming data sent from the user terminals 21 to 24 are received by the IP connector 32, and the streaming data sent from the user terminal 25 are received by the modem 33.

Figures 2, 3:
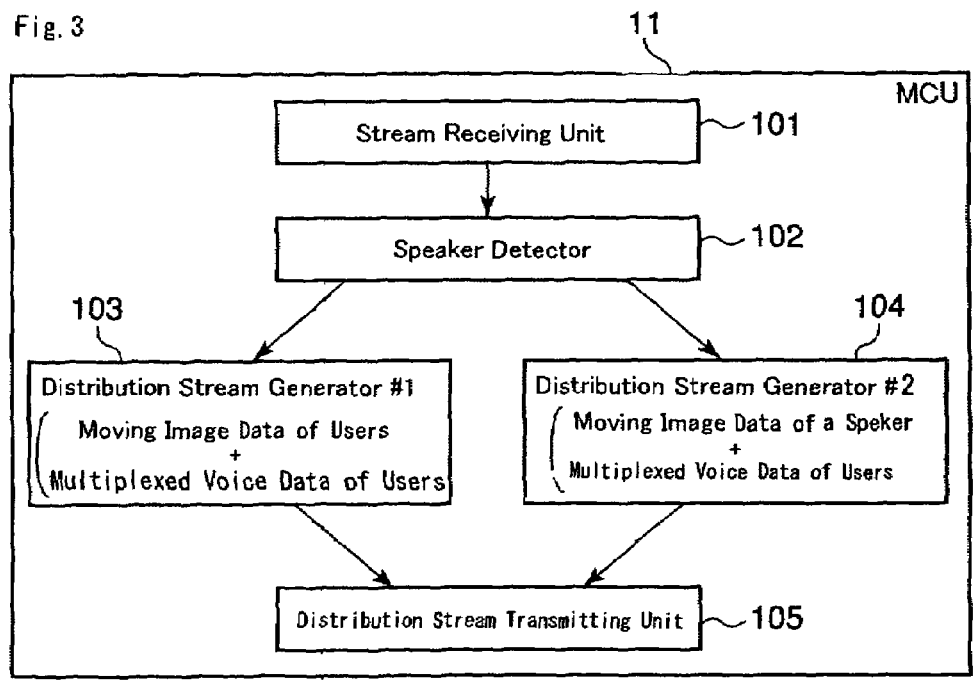
FIG. 2 is a view showing an example of a user information database managed by the data transmission device according to the embodiment.
FIG. 3 is a diagram showing a functional constitution of the data transmission device according to the embodiment.

The storage device 34 may be, for example, a hard disk drive, and information relating to the conference participants is stored in the storage device 34 as a user information data base. In the user information data base, as shown in FIG. 2, information such as a user name field, a password field, a speaker flag field, an IP address field, and a terminal type field of each of the users is managed. The above first distribution streaming data are distributed to the users each of whose terminal types is the personal computer (PC). In turn, the above second distribution streaming data are distributed to the users each of whose terminal types is the PDA or the mobile phone.

A speaker flag to be set in the speaker flag field is used for distinguishing the current speaker. The speaker flag is set in the field corresponding to the current speaker's user terminal.

The demultiplexer 35 separates the streaming data received from each of the user terminals 21 to 25 into a moving image data stream and a voice data stream. The moving image decoder 36 decodes the moving image data stream. The moving image encoder 37 compresses and re-encodes the moving image data which have been decoded by the decoder 36 so as to generate a moving image data stream having a predetermined bit rate for distribution. The voice decoder 38 decodes the voice data stream. The CPU 31 analyzes the voice data which have been sent from each of the user terminals 21 to 25 and decoded by the voice decoder 38 to identify the current speaker. The voice multiplexer 39 multiplexes the voice data which have been sent from each of the user terminals 21 to 25 and decoded by the voice decoder 38. The voice encoder 40 compresses and encodes the voice data which have been sent from each of the user terminals 21 to 25 and multiplexed by the voice multiplexer 39 so as to generate voice data having a predetermined bit rate for distribution. The multiplexer 41 generates the distribution streaming data by multiplexing the dynamic image data with the voice data generated by the voice encoder 40.

In addition, it is possible to realize each of the moving image decoder 36, the moving image encoder 37, the voice decoder 38, the voice multiplexer 39, the voice encoder 40, and the multiplexer 41 by the use of software.

Next, with reference FIG. 3, a logical constitution of the function of the multipoint controller 11 will be described.

The multipoint controller 11 is provided with, as its function modules, a stream receiving unit 101, a speaker detector 102, a first distribution stream generator 103, a second distribution stream generator 104, and a distribution stream transmission unit 105.

The stream receiving unit 101 receives the moving image data stream and the voice data stream from each of the user terminals 21 to 25. The speaker detector 102 performs comparison among gains (voice levels) of the voice data from the user terminals 21 to 25 to identify the current speaker among the users A to E of the user terminals 21 to 25. The user corresponding to the voice data having the highest voice level is identified as the current speaker.

The first distribution stream generator 103 generates the first distribution streaming data. The first distribution streaming data are composed of the data (multiplexed voice data) obtained by multiplexing each of the voices of all the conference participants and the moving image data of all the conference participants as described in the foregoing. The second distribution stream generator 104 selects the moving image data stream sent from the user terminal corresponding to the current speaker detected by the speaker detector 102 among the moving image data streams from the user terminals 21 to 25 to generate the second distribution streaming data. The second distribution streaming data are composed of the data (multiplexed voice data) obtained by multiplexing each of the voices of all the conference participants and the moving image data of the current speaker as described in the foregoing.

The distribution stream transmission unit 105 distributes the first distribution streaming data to the user terminals 21 to 23 and distributes the second distribution streaming data to the user terminals 24 and 25.

Figure 4:
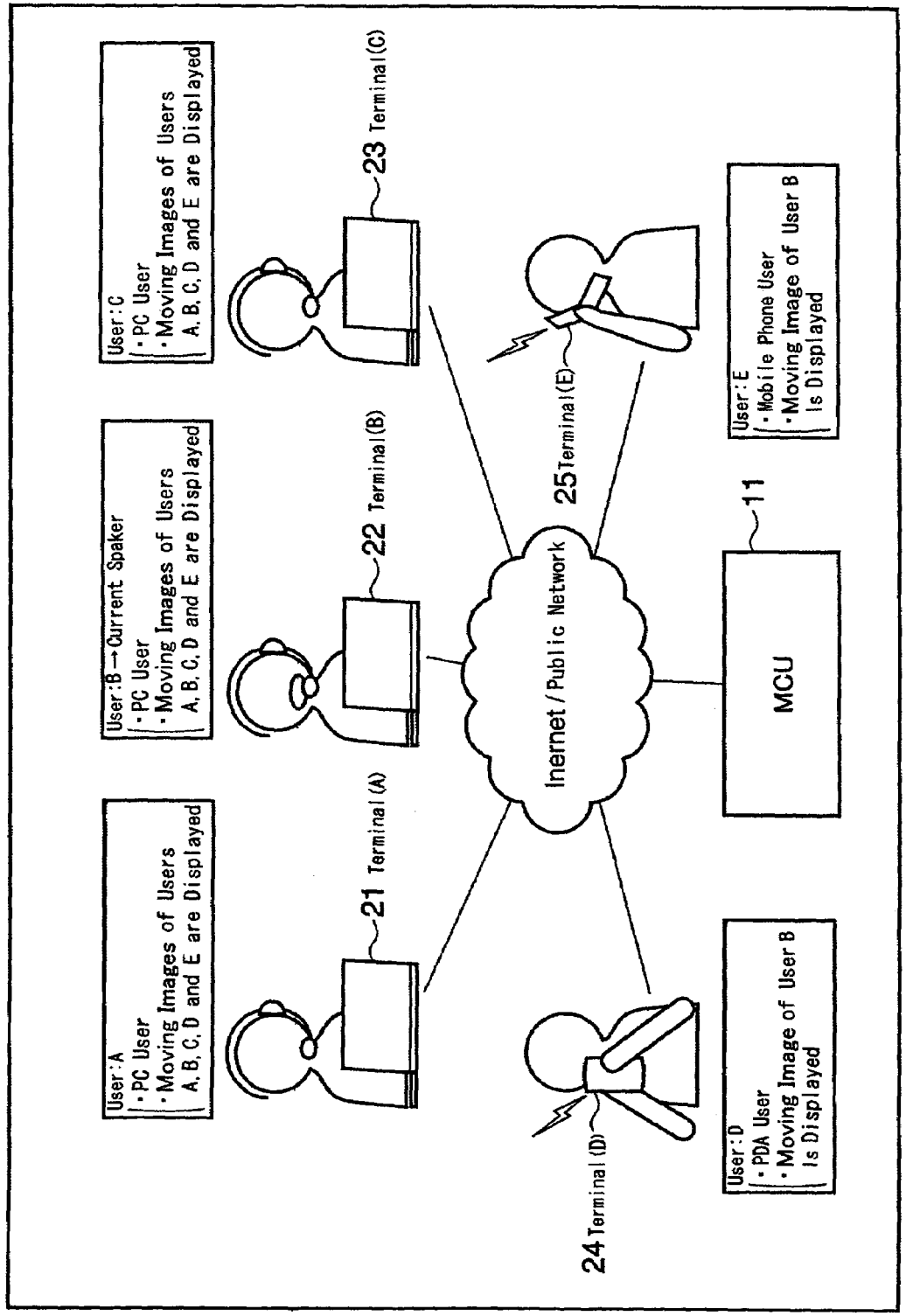
FIG. 4 is a diagram showing a video conference among a plurality of user terminals with the use of the data transmission device according to the embodiment.

A video conference which is being executed among the user terminals 21 to 25 is shown in FIG. 4. The user A, B, and C use personal computers as the user terminals 21, 22, and 23 to participate in the video conference. The user D uses a PDA as the user terminal 24 to participate in the video conference, while the user E uses a mobile phone as the user terminal 25 to participate in the video conference. Moving images of all the conference participants (users A, B, C, D, and E) are displayed on each of the user terminals 21, 22, and 23 corresponding to the users A, B, and C. In turn, only the moving image data of the current speaker are displayed on each of the user terminals 24 and 25 corresponding to the users D and E. When the user B is the current speaker, only moving image data of the user B are displayed on each of the user terminals 24 and 25.

Next, an example of the picture displayed on each of the user terminals will be described.

Figure 5:
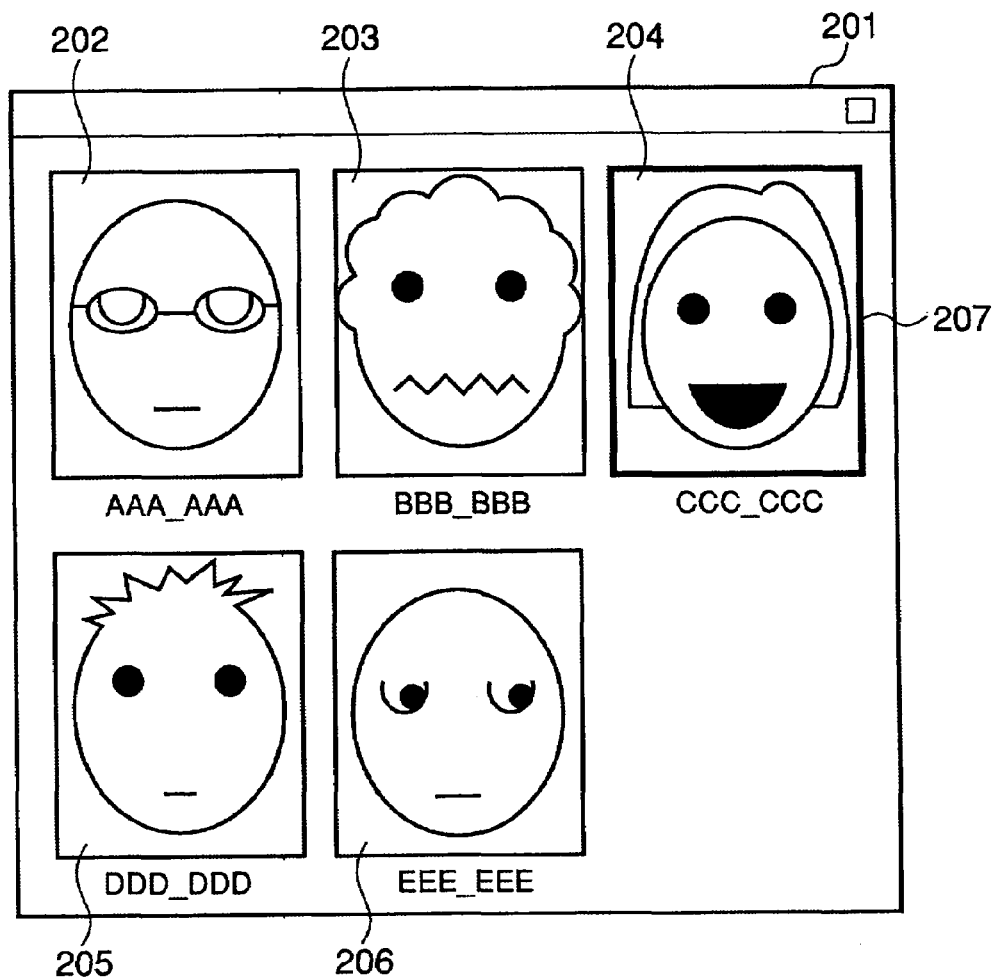
FIG. 5 is a view showing an example of a first conference picture displayed on the user terminals by the data transmission device according to the embodiment.

Shown in FIG. 5 is a conference picture displayed on each of the user terminals 21, 22, and 23. In the conference picture, moving image display areas 202, 203, 204, 205, and 206 corresponding respectively to the conference participants (users A, B, C, D, and E) are arranged. The moving images of the users A, B, C, D, and E are respectively displayed in the moving image display areas 202, 203, 204, 205, and 206. Also, user names of the users A, B, C, D, and E are respectively displayed in lower parts of the moving image display areas 202, 203, 204, 205, and 206. Further, information for distinguishing the current speaker is also displayed. For instance, in the case where the current speaker is the user C, a thick frame as shown in FIG. 5 is displayed around the moving image display area 204 corresponding to the user C as a current speaker identification mark.

The moving images of the users A, B, C, D, and E are contained in the first distribution streaming data distributed from the multipoint controller 11 to each of the user terminals 21, 22, and 23. Also, the names of the users A, B, C, D, and E as well as information for identifying the current speaker are contained in the first distribution streaming data.

Each of the user terminals 21, 22, and 23 may display moving images of the users captured by a camera provided in the respective terminals. In this case, the first distribution streaming data to be distributed to the user A does not need to include the moving image of the user A. Likewise, the first distribution streaming data to be distributed to the user B does not need to include the moving image of the user B.

Figure 6:
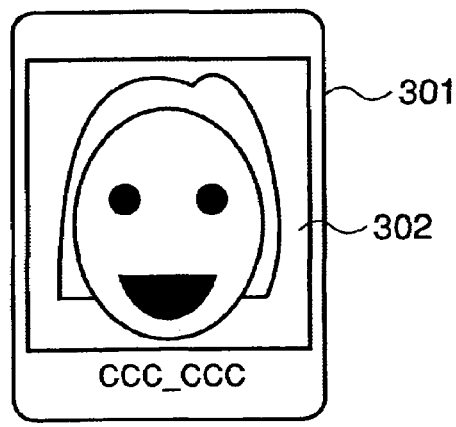
FIG. 6 is a view showing an example of a second conference picture displayed on the user terminals by the data transmission device according to the embodiment.

Shown in FIG. 6 is a conference picture to be displayed on each of the user terminals 24 and 25. A conference picture 301 displayed on each of the user terminals 24 and 25 is constituted only of a moving image display area 302 corresponding to the current speaker. For instance, in the case where the current speaker is the user C, the moving image of the user C is full-screen displayed on the moving image display area 302. Also, a name of the current speaker is displayed in a lower part of the moving image display area 302.

Thus, since only the moving image of the current speaker is displayed as the conference picture of each of the user terminals 24 and 25 which have a relatively small display image size compared to user terminals 21-23, it is possible to sufficiently improve visibility of the image as compared with the case of displaying the images of all the conference participants. Therefore, it is possible to observe details of the speaker's facial expression, such as movements of the mouth, eyes and other facial features.

Figure 7:
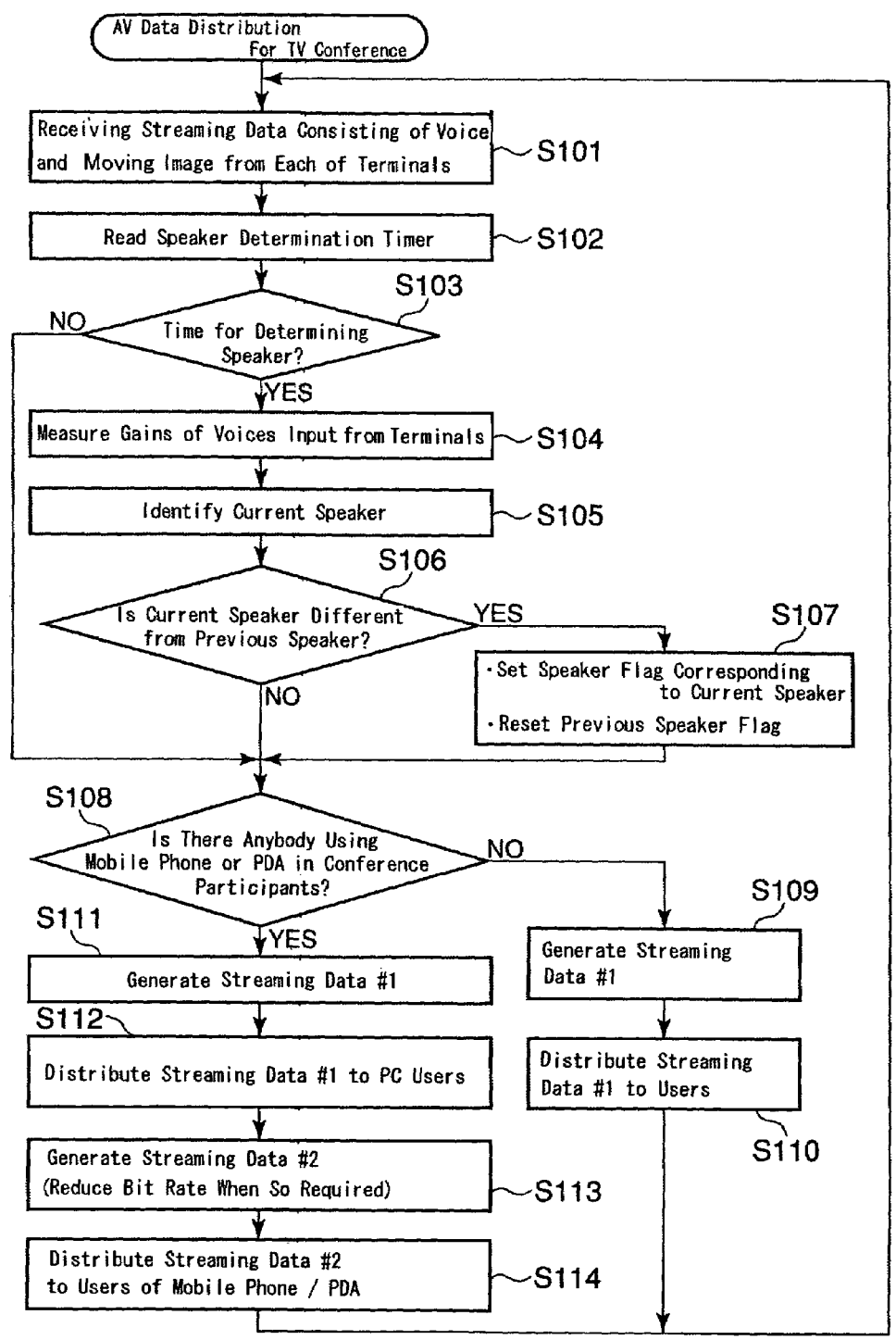
FIG. 7 is a flowchart showing a procedure of a data distribution processing executed by the data transmission device according to the embodiment.

Next, with reference to the flow chart of FIG. 7, the steps related to the distribution process executed by the multipoint controller 11 are described.

The multipoint controller 11 starts to receive the streaming data containing the voice and the moving image, the streaming data being sent from each of the user terminals (Step S101). The multipoint controller 11 reads a value of a speaker determination timer provided therewith (Step S102) to judge whether or not it is the time to determine the speaker (Step S103). The timer is provided in order to prevent too rapid switching of the identification of the current speaker. For example, the current speaker may lower his/her voice or pause speaking for a short time and some background noise present at another speaker's location may temporarily be louder than that of the current speaker. In such a case it is undesirable to switch the display to that of the other speaker. The timer thus sets a time interval, for example, 1-5 seconds, which must elapse between speaker identifications. If this time interval has not elapsed, then a new current speaker will not be determined and the program will proceed from step S103 to step S108.

When it is the time has elapsed for determining the new "current" speaker, (YES in Step S103), the multipoint controller 11 measures gains of the voice data received from the user terminals (Step S104) and identifies a current speaker based on the measurement result (Step S105). The multipoint controller 11 judges whether or not the current speaker identified in Step S105 is different from the previous speaker (Step S106). When the current speaker is different from the previous speaker (YES in Step S106), the multipoint controller 11 sets a speaker flag in the speaker flag field corresponding to the user terminal of the current speaker in the user information database and resets a speaker flag which has been set in a speaker flag field corresponding to the previous speaker in the user information database (Step S107).

Then, the multipoint controller 11 refers to terminal type fields in the user information database to judge whether or not a user using a mobile terminal (mobile phone, PDA) is included in the conference participants (Step S108). In the case where no one in the conference participants uses the mobile terminal (mobile phone, PDA), i.e., when all the conference participants use user terminals each having a large display screen size (personal computer, video conference-dedicated terminal) (NO in Step S108), the multipoint controller 11 generates first distribution streaming data (Step S109) to distribute the first distribution streaming data to all the conference participants (Step S110).

When there is a user who is using a mobile terminal (mobile phone, PDA) (YES in Step S108), the multipoint controller 11 generates first distribution streaming data (Step S111) to distribute the first distribution streaming data to the users using the user terminals each having the large display screen size (personal computer, video conference-dedicated terminal) (Step S112). Then, the multipoint controller 11 selects the moving image data stream corresponding to the set speaker flag from among the image data streams received from all the user terminals to generate second distribution streaming data (Step S113), thereby distributing the second distribution streaming data to the user using the mobile terminal having the small display screen size (Step S114). A process for reducing the bit rate of the streaming data is performed when so required in Step S113. Since the amount of data associated with the moving image data for the second distribution streaming data is less than that of the first distribution streaming data, the data transfer bit rate used in transmitting the second distribution streaming data may be less than that used in transmitting the first distribution streaming data.

As described above, the display of the mobile terminal is used to display only the current speaker, so that a mobile terminal (e.g., mobile phone and PDA) can effectively use image information of a video conference.

Particularly, by selectively transmitting either the first distribution streaming data containing the moving images of all the conference participants or the second distribution streaming data containing only the moving image of the speaker depending on the type of each of the user terminals, it is possible to provide video conference image information optimized for the type of the user terminal.

In addition, the second distribution streaming data may be distributed to the user terminals each having the large display screen size (personal computer, video conference-dedicated terminal).

Shown in FIG. 8 is another example of the user information database controlled by the multipoint controller 11. In this user information database, a display mode field is added to the user information database shown in FIG. 2. The display mode field is a field in which display mode information for specifying the type of streaming data to be distributed is stored. A mode 1 specifies a distribution of the first distribution streaming data. A mode 2 specifies a distribution of the second distribution streaming data. The user of the user terminal with a large display screen size (personal computer, video conference-dedicated terminal) can select either the mode 1 and the mode 2. The mode selection is performed during system set-up, but may also be changed by the user during the conference call by a command sent from the user to the multipoint controller 11 using function keys on the user's keyboard that are recognized by the multipoint controller 11 as part of the conference interface protocols.

Figure 9:
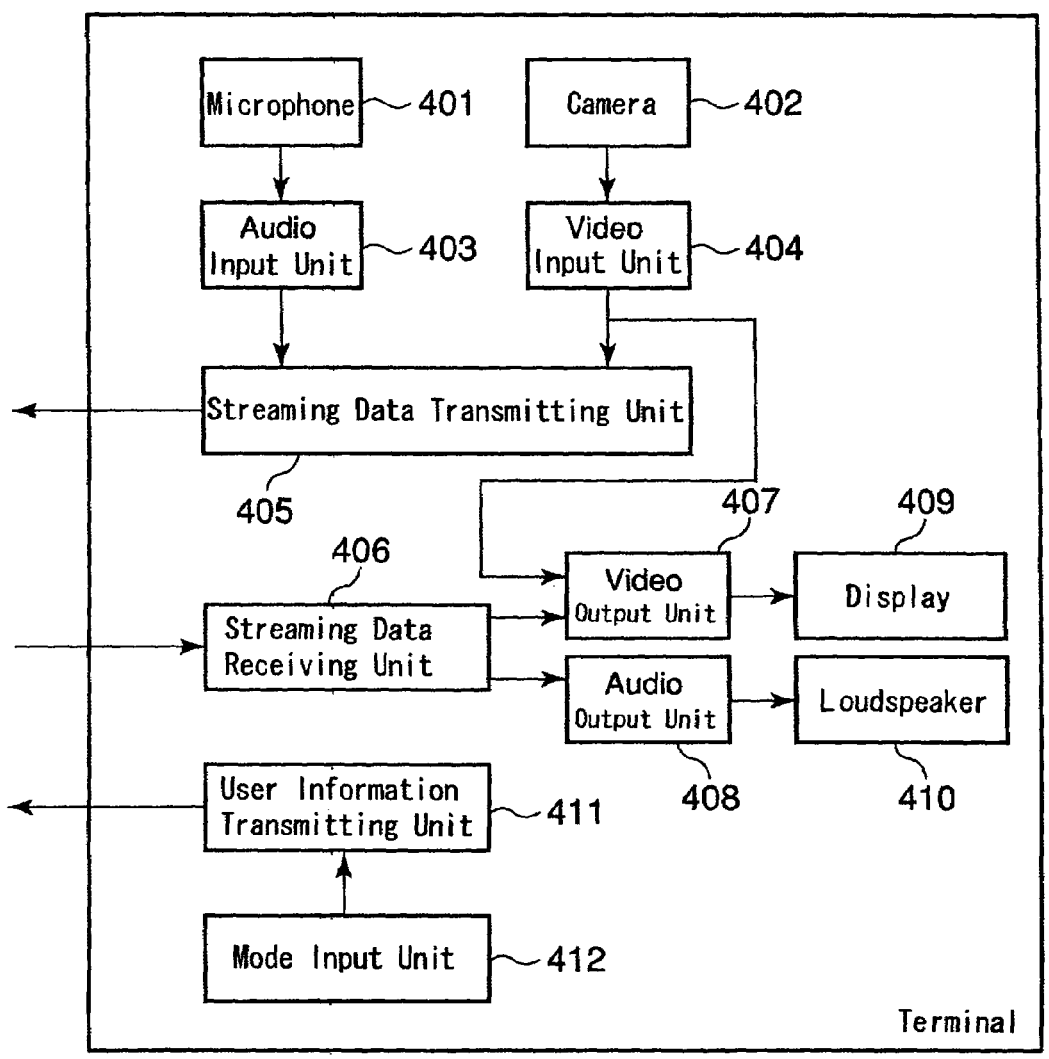
FIG. 9 is a diagram showing a constitution of a user terminal used in the video conference system shown in FIG. 1.

Shown in FIG. 9 is an example of a constitution of the user terminal with the large display screen size. The user terminal is provided with a microphone 401, a camera 402, an audio input unit 403, a video input unit 404, a streaming data transmission unit 405, a streaming data receiving unit 406, a video output unit 407, an audio output unit 408, a display 409, a loudspeaker 410, a user information transmission unit 411, and a mode input unit 412 as shown in FIG. 9.

The voice of the user is sent to the streaming data transmission unit 405 via the microphone 401 and the audio input unit 403. The moving image of the user captured by the camera 402 is sent to the streaming data transmission unit 405 via the video input unit 404. The streaming data transmission unit 405 compresses and encodes the voice data and the moving image data of the user to transmit streaming data containing the compressed and encoded voice data and the compressed and encoded moving image data to the multipoint controller 11. The streaming data receiving unit 406 receives distribution streaming data transmitted from the multipoint controller 11. In the streaming data receiving unit 406, a moving image data stream and a voice data stream are separated from the distribution streaming data, and the moving image data stream and the voice data stream are each decoded. The decoded moving image data are sent to the video output unit 407, while the decoded voice data are sent to the audio output unit 408. The video output unit 407 combines the moving image data sent from the streaming data receiving unit 406 with the moving image data sent from the video input unit 404 to display the combined data on the display 409. In order to reproduce the voice data sent from the streaming data receiving unit 406, the audio output unit 408 sends the voice data to the loudspeaker 10.

The mode input unit 412 is an input device for inputting display mode specifying information which specifies either one of the mode 1 and the mode 2. The display mode specifying information which has been input by way of the mode input unit 412 is sent to the multipoint controller 11 by the user information transmission unit 411. The display mode specifying information transmitted from the user terminal is registered in the user information database of the multipoint controller 11. The mode input unit 412 may comprise a series of keys on the keyboard of the user terminal (e.g., PC keyboard) such as a function key combined with an alpha-numeric key or may employ the user's display screen with PC mouse used to select the desired display mode as part of the set up interface when the conference call is being established. In the case of a video conference-dedicated terminal, there is provided a dedicated control button which, when operated by the user, sends a command to the multipoint controller 11 (via the user information transmitting unit) to effect change of data transmission between modes 1 and 2.

Figure 10:
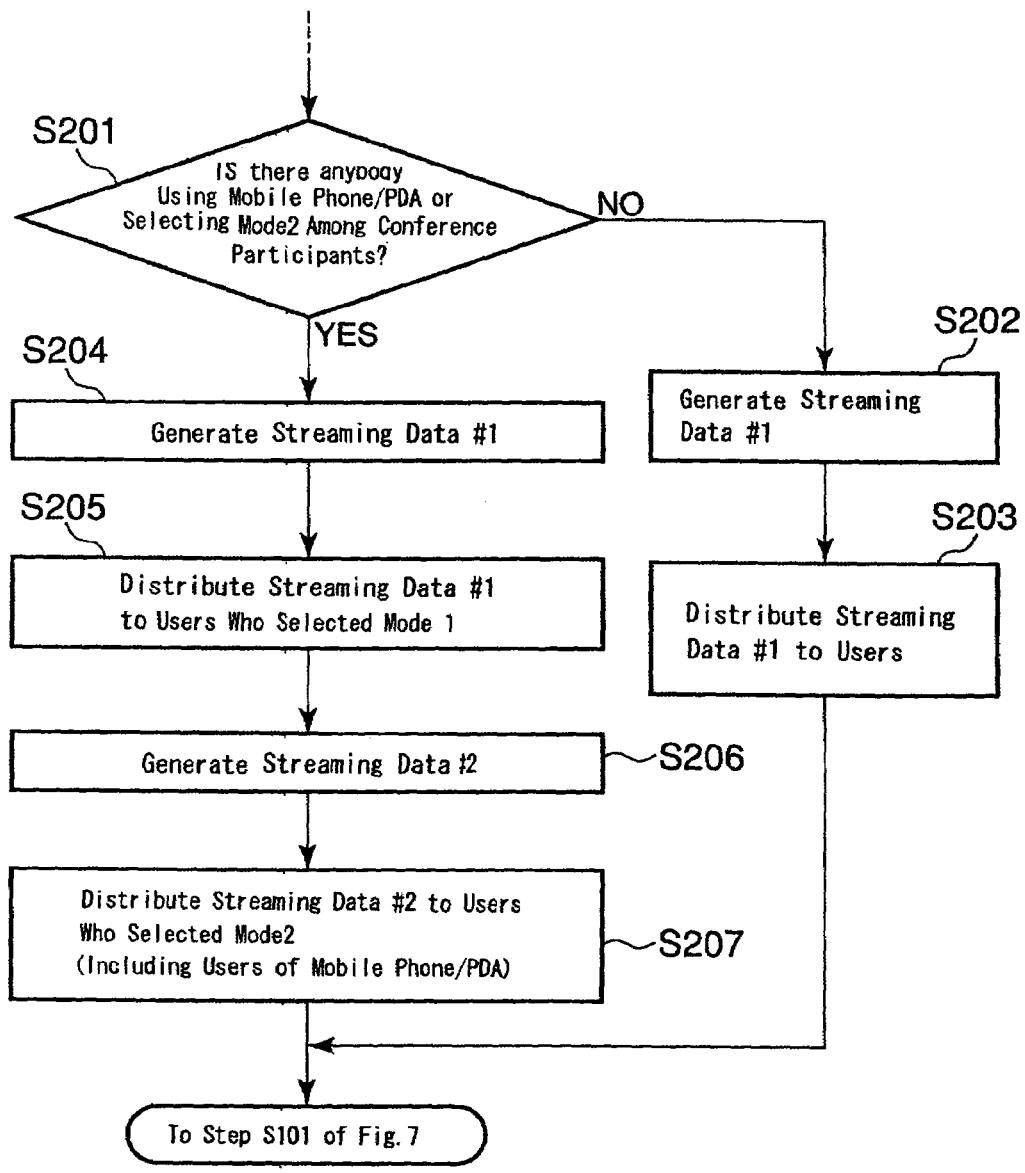
FIG. 10 is a flowchart showing another procedure of the data distribution processing executed by the data transmission device according to the embodiment.

Next, with reference to the flowchart of FIG. 10, steps of a second mode of distribution process executed by the multipoint controller 11 will be described. In this process, Steps S201 to S207 shown in FIG. 10 are executed in place of the Step S108 to S114 of FIG. 7. After the Steps S101 to S107 are executed, Step S201 of FIG. 10 is executed.

In Step S201, the multipoint controller 11 refers to the terminal type fields and the display mode fields of the user information database to judge whether or not a user using a mobile terminal (mobile phone, PDA) and a user specifying the mode 2 are included among conference participants.

When a user using the mobile terminal (mobile phone, PDA) and the user specifying the mode 2 are not included among the conference participants (NO in Step S201), the multipoint controller 11 generates first distribution streaming data (Step S202) for distribution to all the conference participants (Step S203).

When there is a user using the mobile terminal (mobile phone, PDA) or the user specifying the mode 2 among the conference participants (YES in Step S201), the multipoint controller 11 generates first distribution streaming data (Step S204) to distribute the first streaming data to the users specifying mode 1 (Step S205) Then, the multipoint controller 11 generates second distribution streaming data (Step S206) to distribute the second distribution streaming data to the users using the mobile terminal and the users specifying mode 2 (Step S207).

According to the above process, it is possible to distribute only the moving image data of the speaker also to the user using a personal computer or a video conference-dedicated terminal as the user terminal when so required.

This invention is not limited to the above-described embodiment as it is, and it is possible to modify constituents of the embodiment in practical applications without departing from the subject mater of the invention.

What is claimed is:

1. A data transmission device for executing a data transmission to and from each of a first user terminal, a second user terminal, and a third user terminal, comprising:
   a receiving unit for receiving voice data and moving image data transmitted from each of the first user terminal and the second user terminal;
   an identifying unit for identifying a user terminal of a current speaker from among the first user terminal and the second user terminal, based on the voice data which have been transmitted from the first user terminal and the second user terminal and received by the receiving unit;
   a selecting unit for selecting from among the moving image data sent from the first user terminal and the second user terminal the moving image data corresponding to the user terminal identified by the identifying unit;
   a storage unit for storing information related to the user terminal of the current speaker identified by the identifying unit; and
   a transmitting unit for transmitting selected image information having the moving image data selected by the selecting unit to the third user terminal, and not the image information having the moving image data which is not selected by the selecting unit.

2. The data transmission device according to claim 1, further comprising:
   a multiplexing unit for multiplexing the voice data which have been transmitted from the first user terminal and the second user terminal and received by the receiving unit, wherein
   the transmitting unit includes a unit for transmitting the selected image information and the voice data multiplexed by the multiplexing unit to the third user terminal.

3. The data transmission device according to claim 1, wherein the third user terminal includes a mobile terminal.

4. A data transmission device for executing a data transmission to and from each of a plurality of user terminals including a mobile terminal, comprising:
   a receiving unit for receiving voice data and moving image data transmitted from the plurality of user terminals;
   an identifying unit for identifying a user terminal of a current speaker from among the plurality of user terminals, based on the voice data which have been transmitted from the plurality of user terminals and received by the receiving unit;
   a multiplexing unit for multiplexing the voice data which have been transmitted from the plurality of user terminals and received by the receiving unit;
   a selecting unit for selecting the moving image data of the user terminal identified by the identifying unit from among the moving image data which have been transmitted from the plurality of user terminals and received by the receiving unit;
   a first generating unit for generating first distribution information comprising the moving image data of the plurality of user terminals received by the receiving unit and the voice data multiplexed by the multiplexing unit;
   a second generating unit for generating second distribution information comprising the moving image data selected by the selecting unit and the voice data multiplexed by the multiplexing unit;
   a first transmitting unit for transmitting the first distribution information generated by the first generating unit to the plurality of user terminals other than the mobile terminal; and
   a second transmitting unit for transmitting the second distribution information generated by the second generating unit to the mobile terminal.

5. The data transmission device according to claim 4, wherein the second transmitting unit is operative for transmitting, in the case where mode specifying information for requesting the second distribution information is transmitted from any of the plurality of user terminals other than the mobile terminal, the second distribution information to the user terminal or terminals which have transmitted the mode specifying information.

6. A data transmission method for executing a data transmission to and from each of a first user terminal, a second user terminal, and a third user terminal, comprising:
   a receiving step for receiving voice data and moving image data transmitted from each of the first user terminal and the second user terminal;

an identifying step for identifying a user terminal of a current speaker from among the first user terminal and the second user terminal based on the voice data from the first user terminal and the second user terminal received in the receiving step;

a selecting step for selecting, from the moving image data which was transmitted from the first user terminal and the second user terminal, the moving image data of the user terminal identified in the identifying step;

a storing step for storing information related to the user terminal of the current speaker identified by the identifying step; and a transmitting step for transmitting selected image information comprising the moving image data selected in the selecting step to the third user terminal, and not the image information having the moving image data which is not selected in the selecting step.

7. The data transmission method according to claim 6, further comprising:

a multiplexing step for multiplexing the received voice data which was transmitted from the first user terminal and the second user terminal and received by the receiving unit, wherein the transmitting step includes a step for transmitting the selected image information and the voice data multiplexed by the multiplexing step to the third user terminal.

8. The data transmission method according to claim 6, wherein the third user terminal includes a mobile terminal.

9. A data transmission method for executing a data transmission to and from each of a plurality of user terminals including a mobile terminal, comprising:

a receiving step for receiving voice data and moving image data transmitted from the plurality of user terminals;

an identifying step for identifying a user terminal of a current speaker from among the plurality of user terminals, based on the voice data which have been transmitted from the plurality of user terminals and received in the receiving step;

a multiplexing step for multiplexing the received voice data which have been transmitted from the plurality of user terminals and received in the receiving step;

a selecting step for selecting identified moving image data corresponding to the identified user terminal from among the moving image data which have been transmitted from the plurality of user terminals;

a first generating step for generating first distribution information comprising the moving image data of the plurality of user terminals received in the receiving step and the voice data multiplexed in the multiplexing step;

a second generating step for generating second distribution information comprising the identified moving image data and the received multiplexed voice data;

a first transmitting step for transmitting the first distribution information generated in the first generating step to the plurality of user terminals other than the mobile terminal; and a second transmitting step for transmitting the second distribution information generated in the second generating step to the mobile terminal.

10. The data transmission method according to claim 9, further comprising a third transmitting step for transmitting, in the case where mode specifying information for requesting the second distribution information is transmitted from any of the user terminals other than the mobile terminal, the second distribution information to the user terminal or terminals which have transmitted the mode specifying information.

11. A video conferencing system comprising;

a) at least a first user terminal, a second user terminal and a third user terminal, each of said first, second and third user terminals transmitting voice data and moving image data and each having a display for displaying a moving image and each having a speaker for reproducing voice data;

b) a multipoint controller including:

1) a receiving unit for receiving the voice data and the moving image data transmitted from each of the first user terminal and the second user terminal;

2) an identifying unit for identifying a user terminal of a current speaker from among the first user terminal and the second user terminal, based on the voice data which have been transmitted from the first user terminal and the second user terminal and received by the receiving unit;

3) a selecting unit for selecting from among the moving image data sent from the first user terminal and the second user terminal the moving image data corresponding to the user terminal identified by the identifying unit;

4) a storage unit for storing information related to the user terminal of the current speaker identified by the identifying unit, and 5) a transmitting unit for transmitting selected image information having the moving image data selected by the selecting unit to the third user terminal, and not the image information having the moving image data which is not selected by the selecting unit; and c) said selected image information displayed on the display of said third user terminal.

12. The system as recited in claim 11 wherein said multipoint controller further comprises a multiplexing unit for multiplexing the voice data which have been transmitted from the first user terminal and the second user terminal and received by the receiving unit; and wherein said transmitting unit transmits said multiplexed voice data to said first, second and third user terminals.

13. The system as recited in claim 12 wherein said third user terminal comprises a mobile user terminal having a relatively small display as compared to the displays of said first user terminal and the second user terminal.

14. The system as recited in claim 13 wherein:

said transmitting unit transmits said multiplexed voice data and said moving image data from all of said first, second and third user terminals to each of said first and second user terminals.

15. The system as recited in claim 14 wherein said transmitting unit transmits said multiplexed voice data and said selected image information at a lower data transfer rate than a data transfer rate used for transmitting said multiplexed voice data and said moving image data from all of said first second and third user terminals.

16. The system as recited in claim 11 wherein said third user terminal comprises a mobile user terminal having a relatively small display as compared to the displays of said first user terminal and the second user terminal.

* * * * *